United States Patent [19]

Talafuse

[11] 4,418,947

[45] Dec. 6, 1983

[54] SWIVEL JOINT FOR IMPROVED BEARING AND SEAL LIFE

[75] Inventor: Larry J. Talafuse, Denver, Colo.

[73] Assignee: FMC Corporation, Chicago, Ill.

[21] Appl. No.: 235,865

[22] Filed: Feb. 19, 1981

[30] Foreign Application Priority Data

Mar. 21, 1980 [GB] United Kingdom ................. 8009731

[51] Int. Cl.³ ............................................ F16L 27/00
[52] U.S. Cl. .................................... 285/168; 192/45; 285/276; 285/278; 285/369
[58] Field of Search ............... 192/45, 41 A; 285/272, 285/281, 280, 278, 168, 276, 369

[56] References Cited

U.S. PATENT DOCUMENTS

| | | | |
|---|---|---|---|
| 2,379,035 | 6/1945 | Phillips | 285/281 X |
| 2,481,066 | 9/1949 | Bagge | 192/45 X |
| 2,507,849 | 5/1950 | Bland | 285/281 |
| 3,404,760 | 10/1968 | Benson et al. | 192/45 |
| 3,557,921 | 1/1971 | Takada | 192/45 |
| 3,662,867 | 5/1972 | Kinzbach | 192/41 A |
| 3,990,555 | 11/1976 | Carullo | 192/45 |
| 4,039,058 | 8/1977 | Trzebiatowski | 192/45 |
| 4,221,408 | 9/1980 | Lochte et al. | 285/281 X |

FOREIGN PATENT DOCUMENTS 820689 11/1951 Fed. Rep. of Germany ........ 192/45
2225394 12/1973 Fed. Rep. of Germany ........ 192/45

Primary Examiner—Thomas F. Callaghan
Attorney, Agent, or Firm—L. B. Guernsey; W. W. Ritt, Jr.; R. B. Megley

[57] ABSTRACT

A swivel joint having improved bearing and seal life includes a pair of annular inner members each rotatably mounted in the bore of an annular sleeve with the ends of the inner members spaced from each other. An overrunning clutch between a first inner member and the sleeve allows the first inner member to rotate in a first direction relative to the sleeve, but prevents rotation in a second direction. Another overrunning clutch between the sleeve and the second inner member allows the sleeve to rotate in the second direction relative to the second inner member, but prevents rotation in the first direction. Bearings and seals mounted between the sleeve and the first inner member experience unidirectional rotation in the first direction and bearings and seals between the sleeve and the second inner member experience unidirectional rotation in a second direction. The overrunning clutches prevent oscillatory motion of the seals and bearings, and decreases wear and failure of the seals and bearings.

5 Claims, 4 Drawing Figures

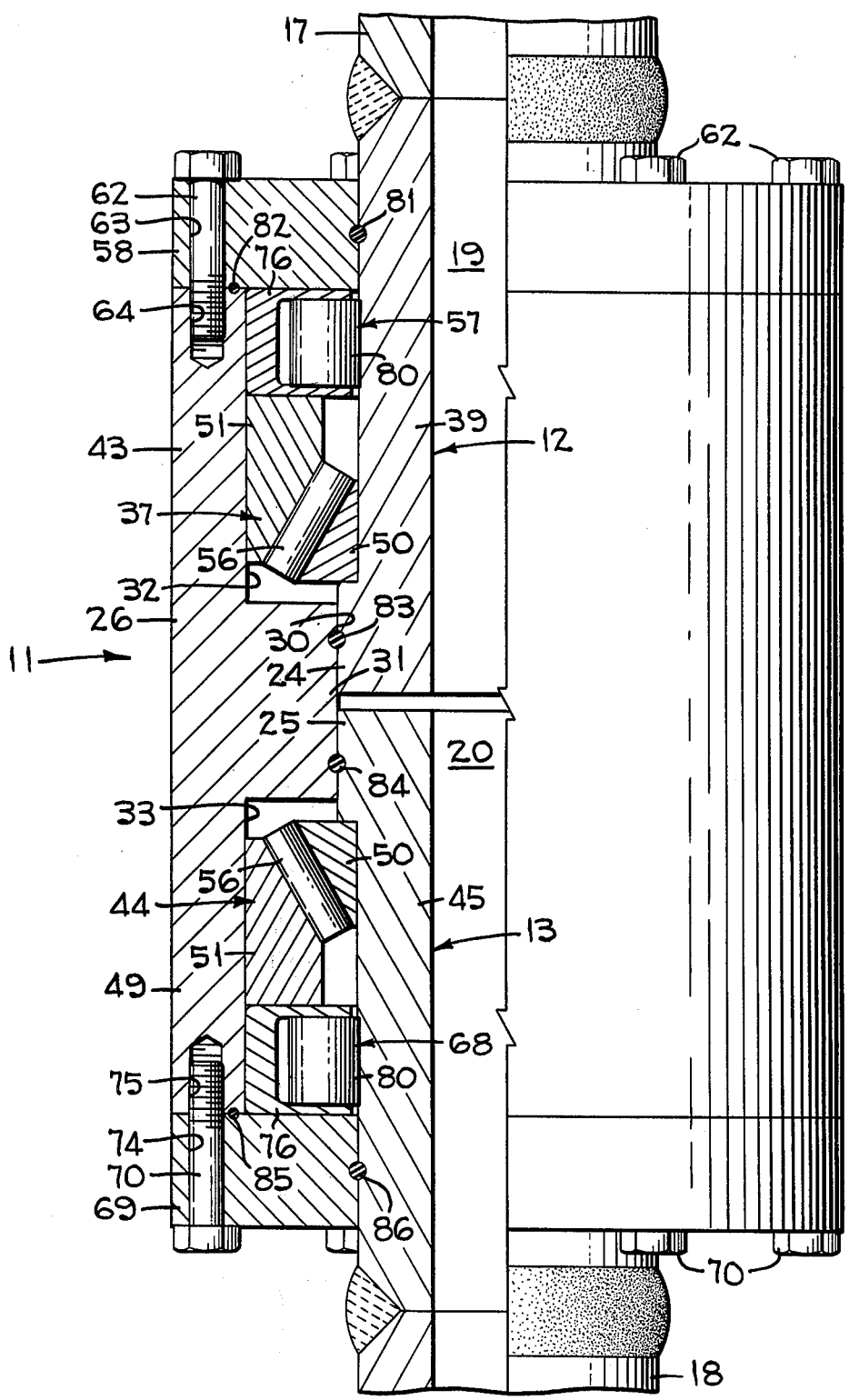
FIG_1

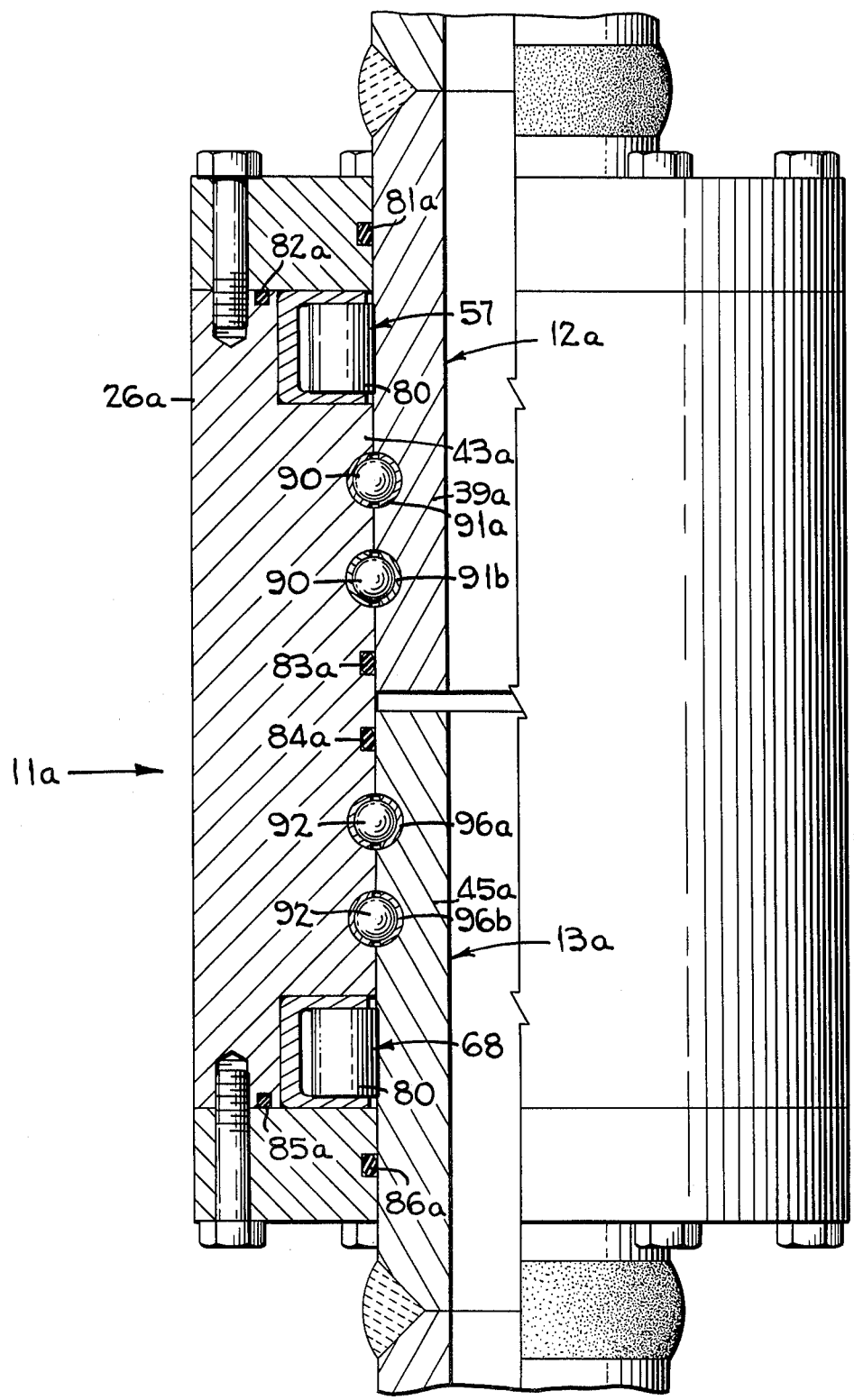
FIG_2

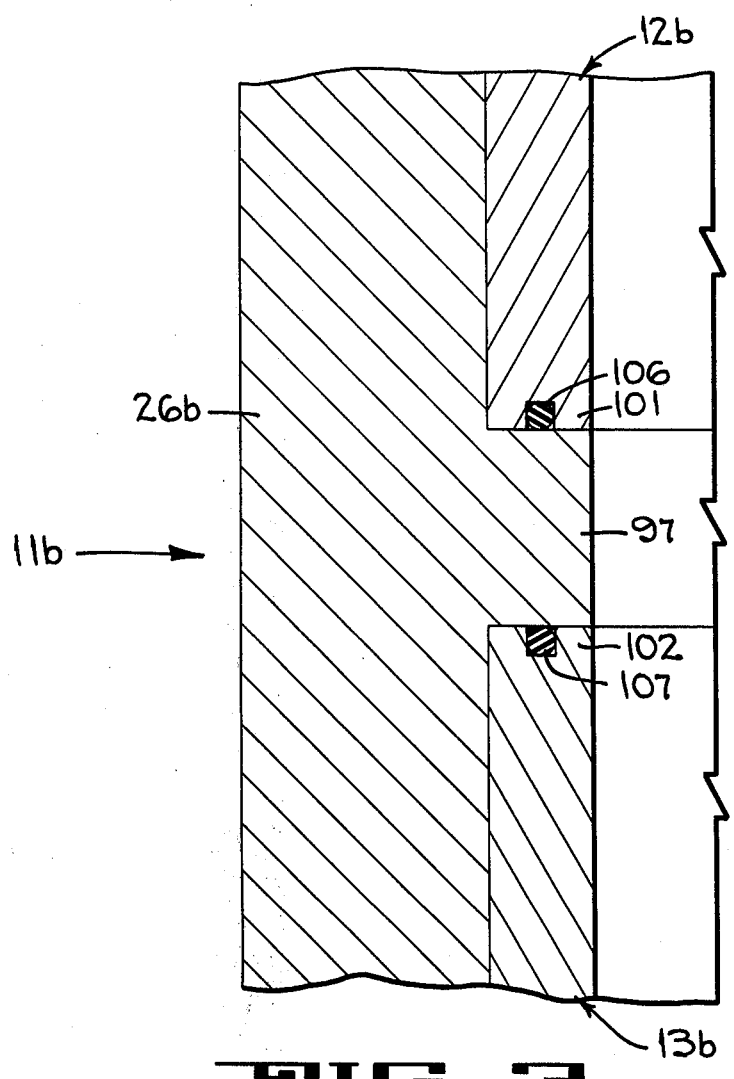
FIG_3

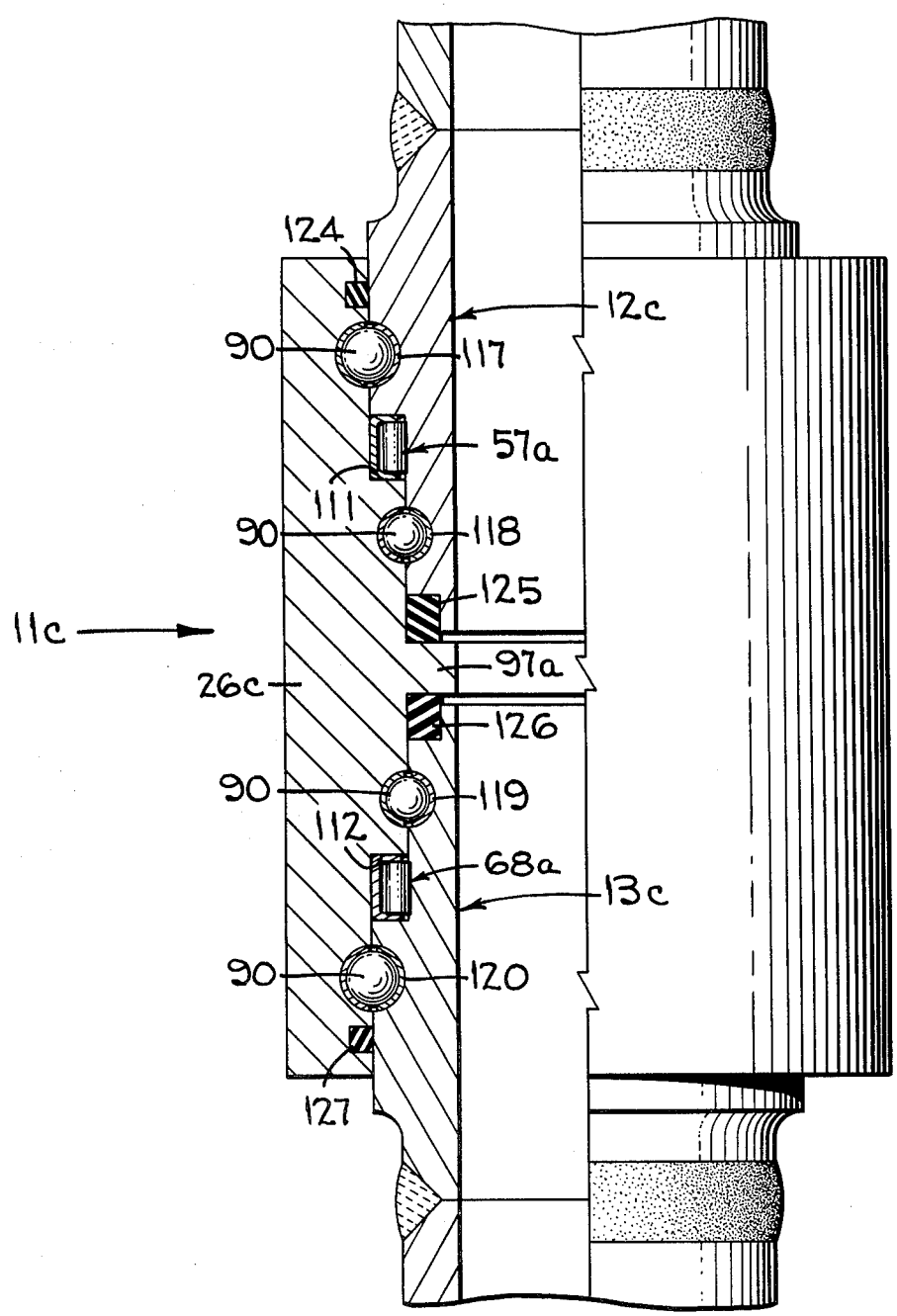

1

SWIVEL JOINT FOR IMPROVED BEARING AND SEAL LIFE

BACKGROUND OF THE INVENTION

1. Field of the Invention

This invention relates to pipe swivel joints, and more particularly, to pipe swivel joints having improved bearing and seal life.

2. Description of the Prior Art

The production of oil and gas from offshore wells is a common endeavor in the petroleum industry. A well or cluster of several wells is drilled in the ocean floor and fluid from these wells transported by conduit to marine tankers which transport the fluid to shore facilities. A system of pipelines convey the fluid from the wells to a platform or floating buoy to which a marine tanker may be attached. The pipeline system includes one or more pipes or conduit extending generally horizontally across the ocean floor from the wells to a point below the floating buoy and a generally vertical pipe or hose extending from the buoy to the horizontal pipe. At a plurality of locations in the pipeline system connections are needed between the various pipes. A flexible hose or an articulated loading arm secured between the buoy and a marine tanker may include one or more connections. Some of these connections are used to permit one pipe or hose to rotate relative to an adjacent pipe or hose by the use of swivel joints. Due to the action of the winds, ocean and the floating buoy these joints may experience an oscillatory motion which produces wear and failure of the joints at a rate more rapid than with a non-oscillatory motion. A fatigue failure occurs in the joints because the same area of the bearing is repetitively loaded rather than distributing the load cycle around the bearing. Elastomeric seals in the joints also tend to fail quickly in oscillatory cyclic applications when all of the oscillatory motion is applied to the seals.

SUMMARY OF THE INVENTION

The present invention comprises a pipe swivel joint for connecting two lengths of pipe in fluid-tight connection having improved life for the joint's bearings and seals. This invention overcomes some of the disadvantages of the prior art by employing a generally cylindrical annular sleeve having an axial extending passage to receive first and second annular inner members each having an axially extending bore therethrough. The inner members extend into the sleeve's passage from opposite ends of the sleeve and are each rotatably connected to the sleeve by bearings mounted between the inside of the sleeve and the outside of a corresponding one of the members. Annular seals mounted between the inside of the sleeve and each of the inner members provide a fluid-tight seal for the joint. An overrunning clutch between the first inner member and the sleeve allows the first inner member to rotate in a first direction relative to the sleeve, but prevents the first inner member from rotating in a second direction. Another overrunning clutch between the sleeve and the second inner member allows the sleeve to rotate in the second direction relative to the second inner member, but prevents rotation in the first direction. The overrunning clutches prevent oscillatory motion of the seals and bearings, and decrease the wear and failure of the seals because each of the seals experience a wearing action only when the sleeve is rotated in one of the two rotational directions. This decreases the wearing motion of the seals by 50%. The fact that the sleeve moves in only one direction across the face of a seal may decrease wearing of the seals and further increase the life of the seals. Bearing life in the pipe swivel joint of the present invention is increased because unidirectional rotation of the sleeve distributes bearing wear over a larger portion of the bearings.

BRIEF DESCRIPTION OF THE DRAWINGS

FIG. 1 is a side elevation, partly in section, of one embodiment of the pipe swivel joint of the present invention.

FIGS. 2-4 are side elevations, partly in section, of other embodiments of the swivel joint of the present invention.

DESCRIPTION OF THE PREFERRED EMBODIMENT

A swivel joint 11 (FIG. 1) of the present invention includes a pair of annular inner or male members 12, 13 each connected to a corresponding pipe 17,18 with each of the inner members 12,13 having a bore 19,20 extending through the length of the inner member to provide a path for fluid to flow between the pipes 17,18. The inner members 12,13 each include radial outward flanges 24,25 at the adjoining ends.

The inner members 12,13 are partly surrounded by an annular sleeve or female member 26 having an annular passage 30 extending axially through the sleeve 26 to receive inner members 12,13. The sleeve 26 includes a radial inward flange 31 which divides the passage 30 into an upper passage 32 and a lower passage 33. A roller thrust bearing 37 is mounted in the upper passage 32 between an outer wall 39 of the inner member 12 and an inner wall 43 of the sleeve 26. Another roller thrust bearing 44 is mounted in the lower passage 33 between an outer wall 45 of the inner member 13 and an inner wall 49 of the sleeve 26.

Each of the thrust bearings 37,44 includes an inner annular ring 50, an outer annular ring 51 and a plurality of rollers or other bearing means 56. The upper bearing 37 is fixed between an overrunning clutch 57 and the radial flange 24 of the inner member 12. The clutch 57 is secured in the upper passage 32 by an annular plate 58 which is secured to the sleeve 26 by a plurality of bolts 62 each extending through a bore 63 in the plate 58 into a threaded bore 64 in the sleeve 26. The lower bearing 44 is fixed between an overrunning clutch 68 and the radial flange 25 of the inner member 13. The clutch 68 is secured in the lower passage 33 by an annular plate 69 which is secured to the sleeve 26 by a plurality of bolts 70 each extending through a bore 74 in the plate 69 into a threaded bore 75 in the sleeve 26.

The overrunning clutches 57,68 each include an annular cup 76 and a plurality of sprags, rollers or other overrunning clutch means 80. The cup 76 is shaped (not shown) about its circumference so that the sprags 80 of clutch 68 are wedged against the surface of the outer wall 45 of the inner member 13 when the sleeve 26 and the cup 76 of the clutch 68 are rotated clockwise, causing the inner member 13 to also rotate clockwise. When the sleeve 26 and the cup 76 of the clutch 68 are rotated counterclockwise the sprags 80 move over the surface of the outer wall 45 allowing the inner member 13 to remain stationary. Thus, the bearings 56 rotate in only one direction and the sleeve 26 moves in only one direction over the seals 84 and 86.

The clutch 57 is mounted so that the sprags 80 are wedged against the surface of the outer wall 39 of the inner member 12 when the sleeve and the cup 76 of the clutch 57 are rotated counterclockwise causing the inner member 12 to also rotate counterclockwise. When the sleeve 26 and the cup 76 of the clutch 57 are rotated clockwise the sprags 80 move over the surface of the outer wall 39 allowing the inner member 12 to remain stationary. The overrunning clutches 57,68 are made by several manufacturers and one such clutch which can be used in the present invention is manufactured by Dana Industrial of Warren, Michigan. A plurality of sealing means 81–86 provide fluid-tight seals between the sleeve 26 and the inner members 12,13.

Another embodiment of the swivel joint 11a shown in FIG. 2 includes a plurality of ball bearings 90 (only two shown) in a pair of bearing races 91a,91b, formed in an outer wall 39a of an inner member 12a and in an inner wall 43a of a sleeve 26a. These ball bearings replace the roller thrust bearing shown in the embodiment of FIG. 1 and couple the sleeve 26a to the inner member 12a. A plurality of ball bearings 92 in a pair of bearing races 96a,96b formed in an outer wall 45a of an inner member 13a and in the inner wall 43a of the sleeve 26a couple the sleeve 26a to the inner member 13a. A plurality of annular sealing means 81a–86a provide fluid-tight seals between the sleeve 26a and the inner members 12a,13a. The overrunning clutches 57,68 provide unidirectional rotational motion between the sleeve 26a and the inner members 12a,13a.

FIG. 3 illustrates another embodiment of the swivel joint 11b wherein an annular sleeve 26b includes a radially inward flange 97 wich separates the ends 101,102 of the inner members 12b,13b. A pair of annular sealing means 106,107 provided a fluid-tight seal between the sleeve 26b and the inner members 12b,13b. The inner members 12b,13b are connected to the sleeve 26b by bearing means (not shown) in the manner described above.

Another embodiment of the swivel joint 11c (FIG. 4) includes an annular sleeve 26c having a central radial flange 97a and a pair of shoulders 111,112 which rest against a pair of overrunning clutches 57a,68a. A pair of annular inner members 12c,13c are rotatably connected to the sleeve 26c by a plurality of ball bearings 90 mounted in a plurality of bearing races 117–120. A plurality of annular sealing means 124–127 provide fluid-tight seals for the joint 11c. The overrunning clutches 57a,68a provide unidirectional rotational motion between the sleeve 26c and the inner members 12c,13c.

The present invention comprises a pipe swivel joint having a pair of overrunning clutches which prevent oscillatory rotational motion between adjacent joint members having seals and bearings between these adjacent members. The overrunning clutches allow the seals and the bearings to experience only unidirectional motion and thus reduce wear and failure of the swivel joint.

Although the best mode contemplated for carrying out the present invention has been herein shown and described, it will be apparent that modification and variation may be made without departing from what is regarded to be the subject matter of the invention.

What is claimed is:

1. A swivel joint for connecting two lengths of pipe, said joint having extended bearing and seal life, said joint comprising:

an annular sleeve having an axial passage extending through said sleeve;

first and second annular inner members each having an axially extending bore therethrough;

means for rotatably mounting said first and second inner members in said axial passage of said annular sleeve;

a first thrust bearing means mounted between said sleeve and said first inner member for absorbing axial thrust between said sleeve and said first inner member;

a second thrust bearing means mounted between said sleeve and said second inner member for absorbing axial thrust between said sleeve and said second inner member;

a first unidirectional unit connected between said sleeve and said first inner member to allow said sleeve to rotate in a first direction relative to said first inner member and prevent said sleeve from rotating in a second direction relative to said first inner member;

a second unidirectional unit connected between said sleeve and said second inner member to allow said sleeve to rotate in said second direction relative to said second inner member and prevent said sleeve from rotating in said first direction relative to said second inner member; and sealing means mounted between said sleeve, and said first and said second inner members.

2. A swivel joint as defined in claim 1 wherein each of said unidirectional units includes an overrunning clutch and means for mounting said clutch between said sleeve and a corresponding one of said inner members.

3. A swivel joint as defined in claim 1 including means for connecting each of said inner members to a corresponding one of said length of pipe to align an axial passage in said pipe with said axial bore in said corresponding inner member.

4. A swivel joint for connecting two lengths of pipe and having means for extending bearing and seal life, said joint comprising:

an annular sleeve having an axial passage extending through said sleeve;

first and second annular inner members each having an axial bore extending through said member;

means for rotatably mounting said first and said second inner members in said axial passage of said annular sleeve;

a first thrust bearing means mounted between said sleeve and said first inner member for absorbing axial thrust between said sleeve and said first inner member;

a second thrust bearing means mounted between said sleeve and said second inner member for absorbing axial thrust between said sleeve and said second inner member;

first and second overrunning clutches;

means for mounting said first clutch between said sleeve and said first inner member to allow said first inner member to rotate clockwise relative to said sleeve and to lock said sleeve to said first inner member when said first inner member rotates counterclockwise;

means for mounting said second clutch between said sleeve and said second inner member to allow said sleeve to rotate counterclockwise relative to said second inner member and to lock said sleeve to said second inner member when said sleeve rotates clockwise;
first sealing means mounted between said sleeve and said first inner member; and
second sealing means mounted between said sleeve and said second inner member.

5. A swivel joint as defined in claim 4 including means for connecting each of said inner members to a corresponding one of said length of pipe to align an axial passage in said pipe with said axial bore in said corresponding inner member.

* * * * *